Dec. 10, 1935. H. H. BEVERAGE Re. 19,784

AERIAL SYSTEM

Original Filed Feb. 21, 1931 2 Sheets-Sheet 1

INVENTOR
HAROLD H. BEVERAGE
BY H. S. Grover
ATTORNEY

Dec. 10, 1935. H. H. BEVERAGE Re. 19,784

AERIAL SYSTEM

Original Filed Feb. 21, 1931 2 Sheets-Sheet 2

INVENTOR
HAROLD H. BEVERAGE
BY H. S. Grover
ATTORNEY

Reissued Dec. 10, 1935

Re. 19,784

UNITED STATES PATENT OFFICE 19,784

AERIAL SYSTEM

Harold H. Beverage, Riverhead, N. Y., assignor to Radio Corporation of America, a corporation of Delaware Original No. 1,967,604, dated July 24, 1934, Serial No. 517,422, February 21, 1931. Application for reissue May 24, 1935, Serial No. 23,252

5 Claims. (Cl. 250—20)

This invention relates to aerial systems and in particular to aerial systems to be used in the vicinity of electrical disturbances as, for instance, on installations adjacent a sparking system such as is used in aircraft work.

It is well known that if a radio receiver is operated adjacent a source of electrical disturbance as, for instance, near the motor of an airplane, considerable difficulties are encountered in the form of noises, due to electrical disturbances, which appear in the indicating device used with the receiver. These electrical disturbances, which produce interference in the receiver, may be due in part to disturbances impressed in the circuits of the receiver and in part to disturbances which affect the aerial system of the receiver.

Many methods have been tried heretofore to prevent or eliminate disturbances from being set up in a receiver which must be operated adjacent to a source of electrical disturbances as, for instance, adjacent the ignition system of an airplane. These schemes generally involve shielding of the ignition system and the spark plugs in addition to shielding of the receiver and filtering out the disturbances by the use of inductances, choke coils, condensers, etc. None of these methods were found to be entirely satisfactory in actual practice. This is due in part to the fact that shielding, unless extremely elaborate, does not eliminate the disturbances in the receiver, and if elaborate is too expensive to be widely used.

An object of applicant's invention is to provide signal receiving means which includes means for overcoming the above defects.

Another object of applicant's invention is to provide a receiving system which includes a novel, though simple and inexpensive, means for preventing noises due to ignition systems or other sources from decreasing the clearness of the signal to be received in the receiver.

Briefly, this is accomplished in accordance with applicant's novel invention by the use of a receiver having a signal energy absorption means including means for introducing disturbances from the disturbing source to the aerial system in the proper amplitude and phase to counteract disturbances reaching the receiver circuits or the main aerial system from the source of electrical disturbances.

More in detail, this is accomplished in accordance with one modification of applicant's invention by the use of a linear conductor extended toward the disturbing source and connected through a variable capacity to a point between the aerial inductance of the receiver and the condenser through which said inductance is connected to the metal frame work of the craft on which the receiver is installed. In this modification the capacity of the aerial to ground and to the source of disturbances is balanced by the variable capacity in the linear conductor extending towards the source and by the capacity connecting the aerial inductance to ground in such a manner as to form a bridge circuit having as a diagonal the aerial inductance. Clearly, if this bridge circuit is balanced or nearly balanced no potential oscillations will appear in the aerial inductance which forms a diagonal of said bridge due to disturbances originating at the disturbing source. If no potential oscillations at the disturbing frequency appear in the aerial inductance it follows that no disturbances will appear in the inductances connected with the receiver nor in the receiver.

In some installations the disturbances may result from a capacity effect between the receiver per se and ground, the receiver and the source of disturbances, the aerial and ground and the aerial and the source of disturbances. In such installations the effect of the disturbances is eliminated in accordance with the present invention by providing a linear conductor connected through a condenser to a point between the main aerial and the aerial inductance in the receiver and extending towards the source an amount sufficient when added to the capacity between the aerial and disturbing source to balance the capacity between the source and the receiver while the capacity between receiver and ground and the aerial and ground balance or substantially balance each other. In this arrangement the receiver is maintained at a radio frequency potential with respect to ground by connecting the receiver through an inductance to the frame of the craft on which it is installed. In this arrangement, as in the prior modification, the inductance in the aerial circuit which provides energy for the receiver forms the diagonal of a bridge circuit and where balance is obtained introduces no disturbing oscillations into the receiver.

In each modification the energizing circuits for the filaments of the tubes may include inductances to prevent radio frequencies from the receiver from passing through the heating battery and also in the modification wherein the receiver is connected through a condenser to the frame to prevent short circuiting of said condenser by the heating circuit between the grounded source and the filaments of the tubes which are grounded to the frame of the aircraft.

The general features of the present invention briefly described above, and numerous subsidiary objects and advantages to be gained from the use thereof, will appear from the following detailed description of the invention.

The description will be made with reference to the drawings throughout which like reference numerals indicate like parts and in which.

Figure 3:
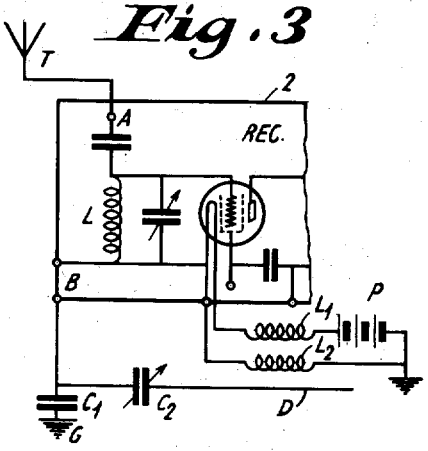
Figure 3 shows more in detail the arrangement of Figure 1.
Figure 3A:
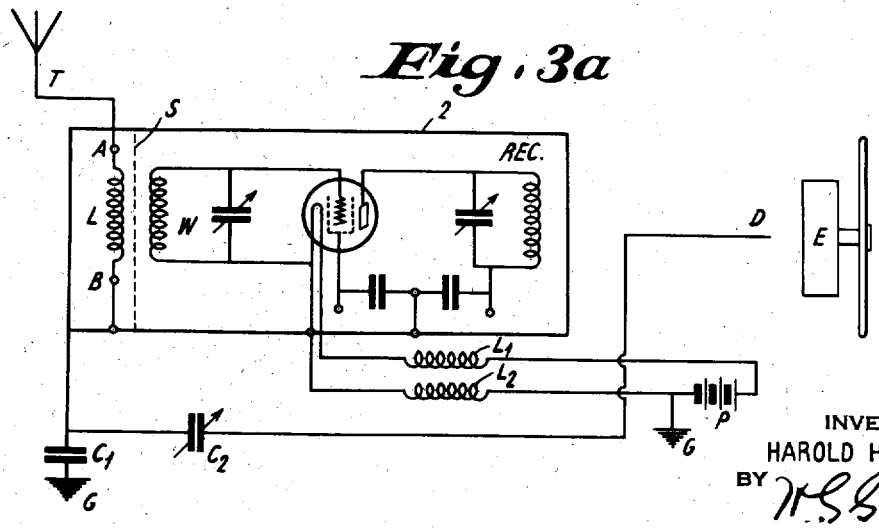

Figure 3*a* is a modification of the arrangement shown in Figure 3.

Figure 4:
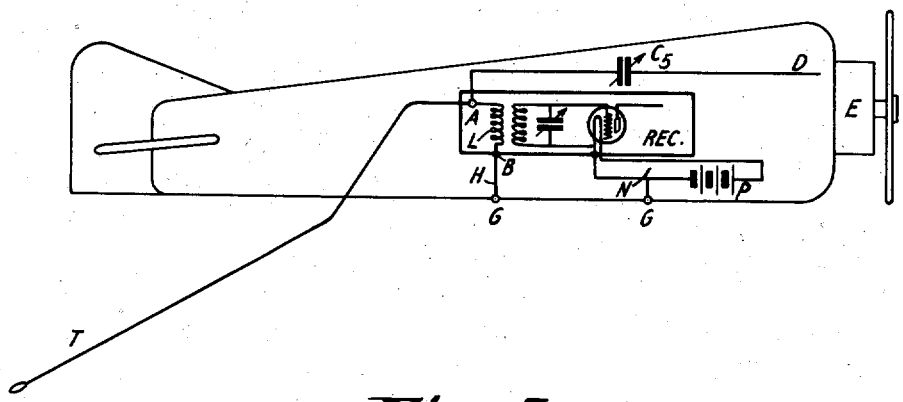

Figure 4 shows a modification of the arrangement of the prior figures; while

Figure 5:
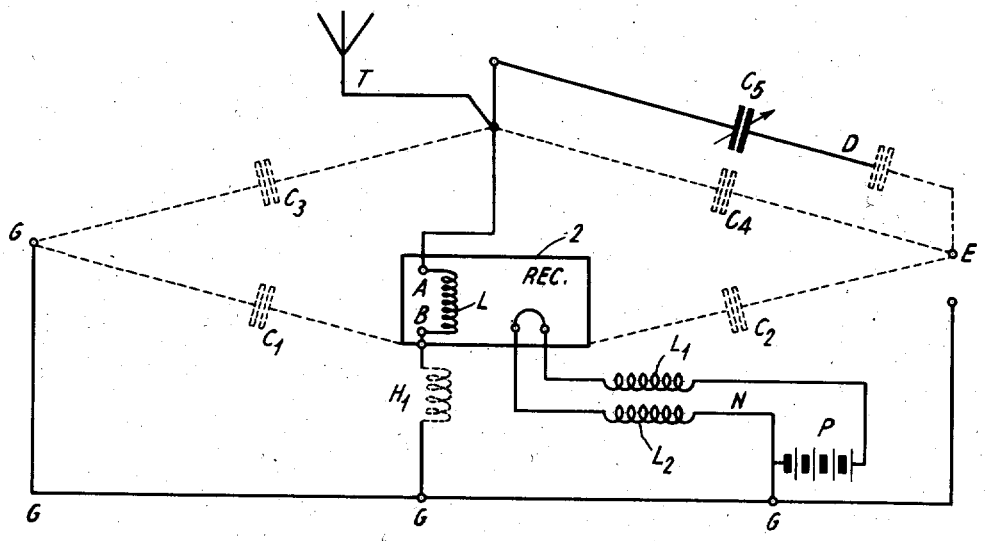

Figure 5 shows the manner in which disturbances which might appear in the aerial system of Figure 4 are balanced out in accordance with the present invention.

Referring in particular to the drawings, 1 indicates the body of an airship. It will be understood that the invention applies equally well to any system to be used on any installation adjacent a source of electrical disturbances as, for instance, on automobiles, ships, and the like. E is a motor for the aircraft and is taken for purposes of illustration as the source of disturbing electrical energy. A receiver 2 is mounted in the body 1. The receiver per se forms no part of the present invention and illustration thereof, detailed in nature, is thought unnecessary. Signal energy is supplied to the receiver by means of a trailing aerial T connected through an inductance L and capacity $C_1$ to ground, which in the present case is the metal framework of the body 1. Disturbances originating at the motor E obviously may be induced into aerial T. In order to prevent disturbing oscillations, which would normally appear in L if induced in T from E, from affecting the receiver, applicant proposes to compensate or balance out these oscillations by other disturbing oscillations equal in amplitude but opposite in phase. This is accomplished by the use of a linear conductor D connected through a variable capacity $C_2$ to the upper electrode of $C_1$, that is, to the lower potential end of inductance L. This linear conductor D may be extended the desired distance from E to obtain disturbing energy of an amplitude at least as great as the disturbing energy induced in T. The condenser $C_2$ allows the energy induced in D to be shifted to the proper phase and amplitude to oppose the energy induced in T.

Figure 1:
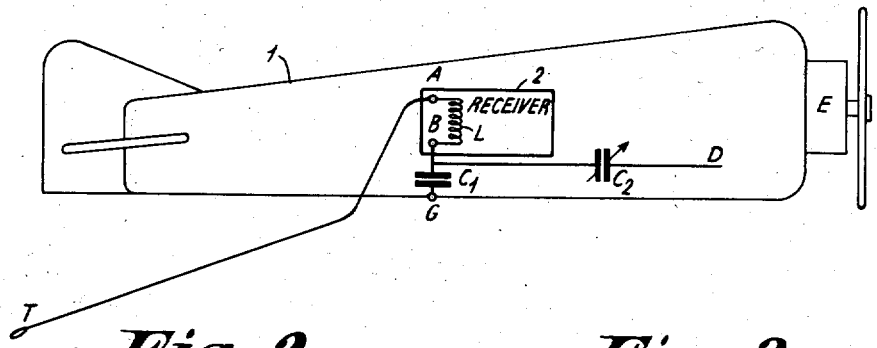
Figure 1 shows diagrammatically, for purposes of illustration only, an aerial system arranged in accordance with the present invention on an airship.
Figure 2:
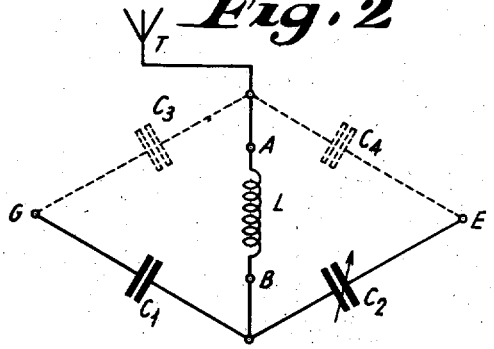
Figure 2 shows the manner in which the disturbances originating in the ignition system are balanced out by including the aerial inductance in the diagonal of a balanced bridge circuit.

The manner in which compensation is effected will be more readily understood by referring to Figure 2 in which inductance L is connected to form the diagonal of a bridge circuit having four arms including capacities $C_1$, $C_2$, $C_3$, $C_4$. $C_4$ represents the capacity between the source E and the aerial T. $C_3$ represents the capacity between ground G and the aerial T. $C_1$ is the capacity $C_1$ of Figure 1 connecting the receiver to the frame G while $C_2$ is the capacity $C_2$ in the linear conductor D of Figure 1. If points A and B on inductance L are made of equal potential with respect to the disturbing oscillations no disturbances will be set up in the receiver 2. This can be accomplished by arranging L in a bridge circuit having four arms, as described above, in which the capacities are such that $C_1$ divided by $C_2$ equals $C_3$ divided by $C_4$.

A practical application of the invention is shown in Figure 3. In actual practice it is common to ground the frame of the receiver to one side of the filament supply and to ground the low side of the antenna input coil to the frame of the receiver. In effect this would tend to short-circuit condenser $C_1$ of Figures 1 and 2. This difficulty is overcome in accordance with the present invention by connecting the filament of the thermionic tube or tubes in the receiver through inductances $L_1$, $L_2$ to the source P. $L_1$, $L_2$ are in parallel with the condenser $C_1$ between the frame of the receiver and the metallic structure G of the aircraft. The inductances $L_1$ and $L_2$ isolate the receiver, that is, allow the receiver to be raised to a potential above the potential of the frame so that normal operation is obtained and the condenser $C_1$ is not in effect short-circuited.

Where short wave lengths are involved the inductances of the leads between the source P and the filaments of the tubes in the receiver may be sufficient to make the system operative without the assistance of the inductances $L_1$, $L_2$. This depends to some extent on the length of the leads from the source to the filaments.

In actual practice, an arrangement, as illustrated in Figure 3*a*, may be employed where an exceptional degree of freedom from disturbances is desired. In this arrangement the aerial system is coupled to the receiver by a transformer, the primary winding of which is in the aerial system and the secondary of which is in the input circuit of the first thermionic stage in the receiver. An electrostatic shield S in the form of a grid of wires, as disclosed in Shapiro application #598,731, filed November 3, 1922, which resulted in U. S. Pat. #1,942,575, issued Jan. 9, 1934 is interposed between the primary winding L and secondary winding W of the transformer. The conductors of this grid may be connected together at one end and to ground. This modification is similar in other respects to the arrangement of Figure 3. In operation the inductance L is included in the diagonal of a bridge circuit as in Figure 3. No disturbing oscillations appear at A and B and so no undesired signals are impressed on the receiver. The screen S shields the receiver electrostatically with respect to the antenna system but allows magnetic coupling between the secondary winding W and the primary winding L in order that signal energy may be transferred from the antenna system to the receiver.

In some installations, where the receiver operates on high frequencies and is grounded through a comparatively long lead to the frame of the airplane, compensation may be obtained by adjusting the position of the main aerial with respect to the source of the disturbing oscillations, thereby varying its exposure to said source. This is thought to be due to the fact that sufficient disturbing noises and oscillations are introduced in the lead between the receiver and the frame to compensate disturbing oscillations introduced in the aerial from the disturbing source. The manner in which this sort of disturbance may be compensated will be understood by referring to Figures 4 and 5 in which the linear conductor D is connected at A to the inductance L and extended more or less in the direction of the source E. In this arrangement the receiver 2 is connected directly to ground by a conductor H, while the leads between the source P and filaments have no bunched inductances. In Figure 5 an aerial system, effected by electrical disturbances from E in a manner similar to that in which the aerial system of Figure 4 is effected, is connected in a diagonal of a bridge circuit so that oscillations at the disturbing frequencies will not appear at A and B. In Figure 5 inductance L is connected in the diagonal of a bridge, one arm of which is formed by the capacity between the frame G and the receiver. This capacity is represented by $C_1$. Another arm of the bridge is formed by the capacity between the source E and the receiver 2 and represented by $C_2$. A third arm of the bridge includes the capacity between the aerial T and ground as represented by $C_3$, while the fourth arm of the bridge includes the capacity between the aerial T and the source E as represented by $C_4$. In the present case $C_4$ is insufficient to balance the bridge. Added capacity is provided by the conductor D connected through a capacity $C_5$ to point A in the aerial system and extended toward the source E.

As pointed out in connection with Figures 1 and 2, if the capacities, including $C_5$, are adjusted so $C_1$ divided by $C_2$ equals $C_3$ divided by ($C_4$ plus $C_5$) no voltage oscillations will appear across A and B and none will be set up in the receiver.

If lead H of Figure 4 is more than a few inches long it will have a considerable impedance. This has been represented in Figure 5 by bunched inductance $H_1$.

In operation the receiver frame can oscillate up and down with respect to the frame of the airplane by building up a potential across the inductance of the lead H and the inductance of the battery leads N. Since the receiver frame and its associated leads may have a considerable area, the capacity $C_2$ may be larger than capacity $C_4$, that is, the receiver frame may have a greater capacity with respect to the ignition system than the capacity between the antenna and ignition system. If $C_2$ divided by $C_4$ is greater than $C_1$ divided by $C_3$ the frame of the receiver will be raised to a potential higher than the potential of the antenna with reference to the disturbing source. Obviously, the disturbance may be balanced by increasing $C_4$, as set forth above, and as illustrated in Figure 5. This has been accomplished, as pointed out above with reference to Figure 5, by extending conductor D towards the ignition system. The same result can be obtained by putting a condenser in shunt to $H_1$ to add to the capacity of $C_1$ or by putting a condenser in series with T, thereby decreasing $C_3$. In some cases a balance may be obtained by reeling the antenna in or out slightly, which, in effect, varies $C_3$.

Having thus described my invention and the operation thereof, what I claim is:

1. In an aerial system to be used adjacent a local source of artificial disturbances, a main absorption member inherently responsive to signal energy and to electrical and magnetic disturbances, an inductance therein adapted to be coupled to a receiving circuit, a connection between said inductance and ground, an auxiliary linear aerial connected to said inductance and extending towards said source, said auxiliary linear aerial being responsive to magnetic and electrical disturbances, and amplitude and phase adjusting means in said auxiliary aerial.

2. Means for preventing disturbing oscillations induced in an aerial system from a source of disturbing oscillations from being set up in the receiver inductance in said aerial system comprising a bridge circuit a diagonal of which includes said receiver inductance, said bridge circuit having four balanced arms, one of which includes the capacity of said aerial to ground, another of which includes the capacity of said aerial with respect to said source and the third of which includes a linear conductor extending from a point on said receiver inductance towards said source.

3. In an aerial system to be used adjacent a local source of artificial disturbances, a main absorption member inherently responsive to signal energy and to electrical and magnetic disturbances, an inductance therein adapted to be coupled to a receiving circuit, a connection between said inductance and ground, including a capacity equal to the inherent capacity between said aerial and ground, and an auxiliary linear aerial conductively connected to said inductance and extended towards said source of disturbances to compensate the direct effect of said source on said aerial system.

4. Means for preventing disturbing oscillations induced in an aerial system including a lumped inductance from a source of disturbing oscillations from setting up in said lumped inductance disturbing currents, which may be transferred to any radio apparatus connected to said aerial, comprising a bridge circuit, a diagonal of which includes said lumped inductance, said bridge circuit having four arms, one of which includes the capacity of said aerial system to ground, another of which includes the capacity of said aerial system with respect to said source of disturbing oscillations, a third of which includes an auxiliary aerial in the field of said source of disturbing oscillations, and a fourth arm of which includes balancing reactance.

5. Means for preventing disturbing oscillations induced in an aerial system from a source of disturbing oscillations from being set up in a reactance connected to said aerial system in which reactance signal energy is to be set up for signalling purposes comprising, a bridge circuit a diagonal of which includes said reactance, said bridge circuit having four balanced arms, one of which comprises the inherent reactance between said aerial system and said source of disturbing oscillations, a second of which arms includes the inherent reactance between said aerial system and ground or equivalent fixed potential structure, a third of which arms comprises a reactance between a point on said reactance connected with said aerial system and ground or equivalent fixed potential structure, and a fourth of which arms comprises a variable reactance connected to said reactance connected with said aerial system and extending toward said source of disturbing oscillations.

HAROLD H. BEVERAGE.